A. E. SCHAAF AND S. W. MILLS.
TRACTOR.
APPLICATION FILED NOV. 26, 1917.
1,342,764.
Patented June 8, 1920.
2 SHEETS—SHEET 1.
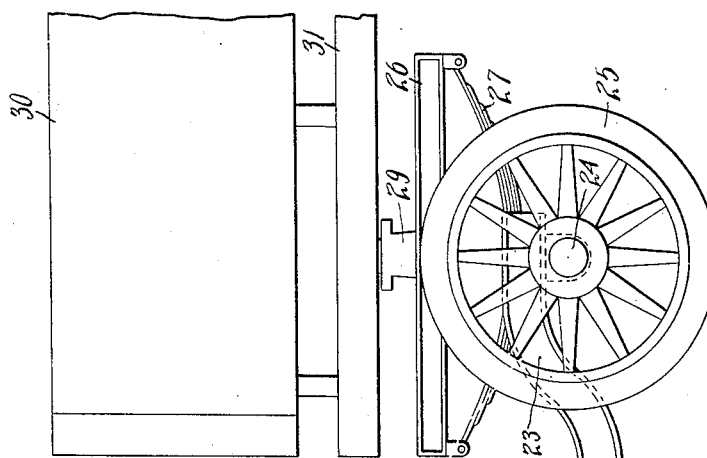
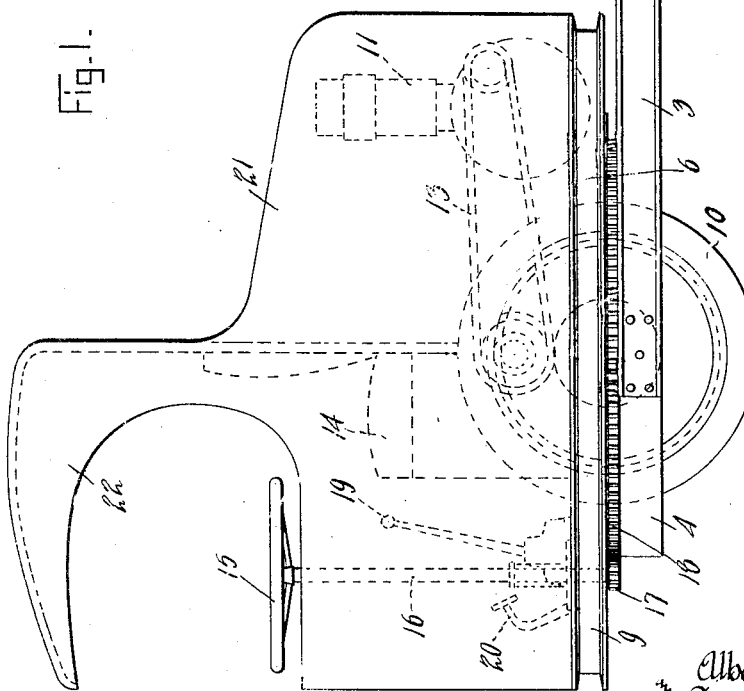
Inventors
Albert E. Schaaf
and Stanley W. Mills
By Bradford & Doolittle
Attorneys

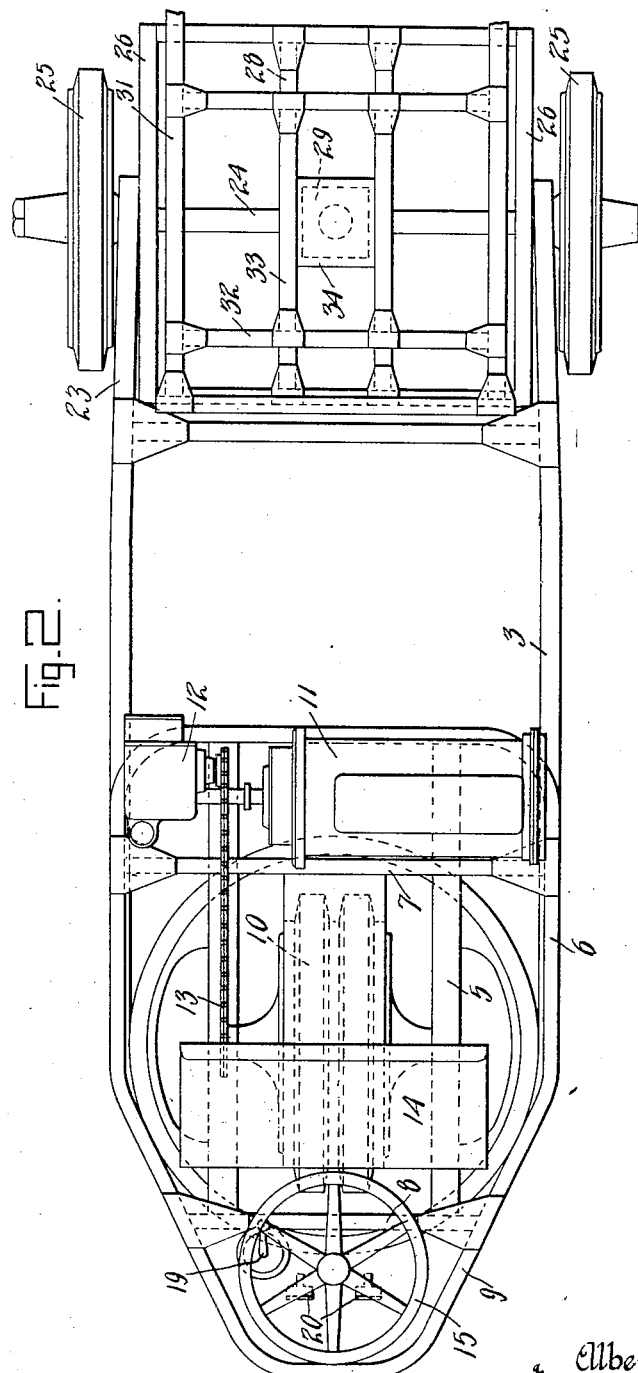

UNITED STATES PATENT OFFICE.

ALBERT E. SCHAAF AND STANLEY W. MILLS, OF INDIANAPOLIS, INDIANA.

TRACTOR.

1,342,764.        Specification of Letters Patent.        Patented June 8, 1920.

Application filed November 26, 1917. Serial No. 204,025.

*To all whom it may concern:*

Be it known that we, ALBERT E. SCHAAF, a citizen of the United States, residing at Indianapolis, Marion county, and State of Indiana, and STANLEY W. MILLS, a citizen of the United States, residing at Indianapolis, Marion county, and State of Indiana, have invented and discovered certain new and useful Improvements in Tractors, of which the following is a specification.

Our said invention relates to tractors, and consists in the combinations and arrangements of elements hereinafter described and particularly set forth in the accompanying claim.

The purpose of the invention is to provide a tractor having a single tractor wheel, whereby to centralize the tractive effort of the whole tractor and thereby obtain its maximum draw-bar pull for hauling trucks or other heavy loads, and wherein the tractor-wheel, the motor, the operator's seat, the steering head, and all controls therefor are assembled and disposed in a manner which will allow the operator all possible freedom, and enable his having the most efficient control in all conditions under which the tractor may be used.

The invention has for its further purpose to construct a tractor of this type having the steering control, the seat for the operator, the tractor wheel, and the motor with transmission disposed in substantial alinement in the order named and in the direction of travel of the vehicle.

The present construction of tractor is proposed as an improvement on the types of tractors disclosed in the co-pending application for U. S. patent, to wit: No. 83,449, filed March 11, 1916, for tractors.

The invention is disclosed by way of illustration in the accompanying drawings wherein—

Figure 1 is a side elevational view of the tractor, and

Fig. 2 a top plan view of the same.

Referring to the construction in further detail and wherein like reference characters designate corresponding parts, the tractor embodies a chassis or frame consisting of a body portion 3 of channel-iron construction and rectangular design, and an annular section 4 is secured rigidly to the front portion of the frame 3 in any appropriate manner. The annular frame section 4 has mounted thereon a revoluble frame section 5 that supports a super-frame 6 by the cross bars 7 and 8, and said super-frame is in part rectangular, and has converging side portions 9 as shown.

The supporting or super-frame 6 carries the tractor wheel 10, the motor 11, transmission 12, driving gear 13, operator's seat 14, and the steering head 15 as shown, and these elements are arranged to equally distribute their weights and with the steering control, the position for the operator, the tractor wheel, power transmission, and the engine in the order named, and disposed from the front to the rear of the chassis as shown.

The shaft 16 of the steering head 15 carries a pinion 17 engaging with an annular gear 18 secured to the annular frame section 4 (see Fig. 1), and the usual transmission control 19 and the brake and gear shifting pedals 20 are provided.

The vehicle cover which incloses substantially all of the working parts consists of a body 21 suitably mounted on the sides of the super-frame structure 6, and supporting a top 22 which overlies the driver's seat and the steering head as shown.

The coupling device for connecting the tractor with the vehicle to be hauled consists of a rectangular frame 26 mounted on the axle 24 supported by wheels 25, and the springs 27 and having a pair of cross members 28 that support one member 29 of a fifth-wheel connection as shown.

The vehicle 30 to be hauled is preferably constructed with an under-frame 31 having cross bars 32 and 33 carrying the other member 34 of the fifth-wheel that pivotally couples with the member 29 by the usual king bolt.

In the construction disclosed, the invention is characterized in that the whole tractive effort is centralized at the one point of ground contact to obtain the maximum draw-bar pull for hauling trucks and other heavy loads, and wherein the motive element, all controls, and the seat for the operator are arranged in a manner giving complete control and a full survey of the tractor and its trailer whether the load be hauled straight-away, turned, or steered in any direction, or backed to the place for unloading.

It is obvious that those skilled in the art may vary the details of construction and arrangement of parts without departing from the spirit of our invention, and therefore we do not wish to be limited to such features except as may be required by the claim.

Having thus described our said invention, what we claim as new and desire to secure by Letters Patent is:

In a tractor the combination of a frame, a revoluble section mounted in the frame, a single tractor wheel journaled in the revoluble section, an operator's seat and a steering control mounted on the revoluble section in advance of the tractor wheel, and a motor and transmission gearing mounted on the revoluble frame in the rear of the tractor wheel and having driving connection therewith, all disposed in radial symmetry to the central vertical axis through the tractor wheel and balanced along the longitudinal medial line of the frame, substantially as set forth.

In witness whereof, we have hereunto set our hands and seals at Indianapolis, Indiana, this 16th day of November, A. D., nineteen hundred and seventeen.

ALBERT E. SCHAAF. [L. S.]
STANLEY W. MILLS. [L. S.]

Witness:
E. W. BRADFORD.